United States Patent
Ding et al.

(10) Patent No.: US 6,658,553 B1
(45) Date of Patent: Dec. 2, 2003

(54) UNIVERSAL POINTER IMPLEMENTATION SCHEME FOR UNIFORMLY ADDRESSING DISTINCT MEMORY SPACES IN A PROCESSOR'S ADDRESS SPACE

(75) Inventors: Zhimin Ding, Sunnyvale, CA (US); Gregory K. Goodhue, San Jose, CA (US); Ata R. Khan, Saratoga, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,987

(22) Filed: Apr. 14, 2000

(51) Int. Cl.[7] ............................................. G06F 12/00
(52) U.S. Cl. ..................... 712/210; 711/212; 711/215
(58) Field of Search ................................. 712/210, 226, 712/227, 211, 212, 205, 42, 43; 711/212, 209, 208, 213, 214, 215

(56) References Cited

U.S. PATENT DOCUMENTS 5,515,540 A * 5/1996 Grider et al. ............... 713/200
5,561,784 A * 10/1996 Chen et al. ................. 711/157
6,070,003 A * 5/2000 Gove et al. ................. 710/317
6,219,797 B1 * 4/2001 Liu et al. .................... 713/500

* cited by examiner

Primary Examiner—Henry W. H. Tsai
(74) Attorney, Agent, or Firm—Michael Schmitt

(57) ABSTRACT

A processing system supports memory access based on distinct memory space access instructions as well as universal access instructions that are independent of memory space partitions. Conventional memory-space dependent instructions, such as MOV, MOVX, and MOVC, provide an optimized addressing scheme, and an extended memory-space independent instruction EMOV provides an optimized code efficiency, processing speed, and ease of code generation. A mapping between the discrete memory space partitions and a "universal" memory space allocation is provided. The processing hardware interprets the universal address to determine the corresponding memory space, and provides the access to an address within that memory space.

15 Claims, 2 Drawing Sheets

UNIVERSAL POINTER IMPLEMENTATION SCHEME FOR UNIFORMLY ADDRESSING DISTINCT MEMORY SPACES IN A PROCESSOR'S ADDRESS SPACE

BACKGROUND OF THE INVENTION

1. Field of the Invention

This invention relates to the field of microprocessors, and in particular to microprocessors having a partitioned memory space.

2. Description of Related Art

An 8-bit data structure and 16-bit address structure has been, and continues to be, a common architecture for low cost microprocessors, or microcontrollers, such as the 80C51 family of processors, and others, that have a legacy that extends back for decades. During these decades, a number of software/firmware applications and routines have been developed.

To remain competitive, application developers continually add features and functions to devices that use microprocessors. Unfortunately, the 16-bit address structure of common processors limits the size of programs, or the amount of data, that can be embodied within these devices. Larger capacity devices, such as 32-bit processors, can address a larger program or data space, but are typically more expensive than conventional 8-bit processors. Moving an existing application from one processor family to another in order to provide a larger addressable space for adding additional features, however, typically requires a substantial investment. The development personnel must be trained to use the new processor; libraries of "utility programs", such as mathematical routines and interrupt routines, must be rewritten for the new processor; time-dependent routines must be tested and verified on the new processor; idiosyncratic behavior of the new processor must be discovered and overcome; and so on.

Expanding the addressing space of an existing processor alleviates a number of the difficulties associated with a transition to a new processor, but also introduces a number of compatibility issues with applications and routines that were developed for the existing shorter-address processor. Conventionally, as additional memory access features are provided to a processor family, additional commands are provided to support these features. These additional commands are specifically designed to maintain compatibility with "legacy" applications that were developed prior to the availability of these new features, or to provide compatibility with existing architectural features of the processor family. For example, the 8051 processor includes access to an internal memory or an external memory. The internal memory is limited to 256 bytes, using an 8-bit addressing scheme with a range of 0 to 255 ($2^8-1$). The external memory can have addresses that extend through the entire 16-bit addressing scheme, with a range of 0 to $2^{16}-1$ (65,535). These different memories are referred to as distinct memory spaces. Note that each memory space is accessible through the entire range provided by the number of bits used for addressing, thereby optimizing the use of addressing bits. That is, in the above example, all of the possible address values (0-65,535) that can be encoded by 16 bits can refer to the external memory, and all of the possible address values (0-255) that can be encoded by 8 bits can refer to the internal memory. Other memory partitioning schemes allocate sub-sets of the possible address values to each memory space, which can result in 'gaps' of memory utilization at the predefined boundaries of these sub-sets. Note, however, that by providing each space with the full range of available address bits, each memory space includes address values that are common to the other. That is, because the first 256 addresses are not reserved exclusively for the internal data memory space, the internal and external data memory spaces include addresses in the range of 0 to 255. To distinguish between an access to an internal memory element having an address between 0 and 255 and an external memory element that also has an address between 0 and 255, different program instructions are provided. A set of "MOV" instructions provides access to the internal memory space, and a set of "MOVX" instructions provides access to the external memory space. Each of the instructions in each set comprises a MOV or MOVX command, as required, typically followed by a reference with which to determine the particular memory location in the corresponding memory space being accessed. The reference value may be, for example, the address of a register that contains an 8-bit address, or, in the case of the external memory space, a register pair that contains a 16-bit address. Commonly used instructions include both the command and the reference to the register or register pair in a single 8-bit byte, to conserve the memory space required for storing the instruction.

In like manner, the program code is stored in a distinct memory space, the "program memory". In order to provide a full range of addresses within the available bits used for addressing the program code, typically 16 bits, the program memory also has an address range of 0 to 65,535 ($2^{16}-1$). To distinguish an access to program code from access to internal or external data items, another distinct instruction, "MOVC" is provided. This instruction includes a "MOVC" command followed by a reference from which to determine the particular memory location in the program memory space that is being accessed. Note that these distinct MOV, MOVX, MOVC instructions, and potentially others, are required because each of the memory spaces have at least one address that is common to an address of another memory space. Note also that the distinct memory spaces are provided to minimize the size of the memory required to store the program instructions that access these memory spaces.

Conventionally, following this same scheme, a new architecture that allows access to a larger memory space, via a three-byte addressing scheme for example, can be supported by expanding the definition of existing program instructions (MOV, MOVX, MOVC, etc.) to include a three-byte (24-bit) address range (0 to ($2^{24}-1$)), as discussed further below with regard to FIG. 2. To maintain compatibility with legacy programs, this expansion would be consistent with the existing use of distinct memory spaces. In this manner, programs and subroutines can continue to use the optimized addressing schemes developed for multiple memory spaces as needed.

Although the use of discrete memory spaces facilitates a minimization of the number of bits required for addressing, it requires an explicit determination of which memory space is being accessed at any given time. At the assembly-language level of programming, this task is not excessively burdensome, because the assembly-language programmer is typically aware of the allocation of data memory between internal and external resources, and is aware of whether the referenced item is a program item or a data item. This awareness, however, is contrary to the general principles of programming at higher levels of abstraction. Higher levels of abstraction are provided to free the programmer from the details of the embodiment, to reduce development time and to reduce the likelihood of errors. In some cases, it is impossible to determine a priori where a variable in a higher level program is located. This is particularly true with regard to the common use of "pointers" in higher level programming languages, such as the "C" programming language. A subroutine that is used to compute and return one or more results is usually called with pointer-arguments that point to the locations at which to place the computed results. Note that the pointer-argument may point to an internal or an external data memory location, or a location in the program memory, and the subroutine is compiled without knowledge of which memory space(s) may be used to store the results when this routine is actually called. Therefore, each pointer-argument must include an identification of the memory space to which it points, and the compiled code for the subroutine must include each of the forms of memory access (MOV, MOVX, MOVC instructions) for each possible memory space identification associated with each pointer. That is, although the intent of discrete memory space partitioning is to reduce the amount of memory required to effect memory accesses, the savings are often obviated by the generation of a substantial amount of code when the processor-level program instructions are generated from higher level programming instructions. This inefficiency may also occur when the processor-level program instructions are created directly for subroutines that are purposely designed to be usable regardless of the particular arguments provided.

BRIEF SUMMARY OF THE INVENTION

It is an object of this invention to provide a processing system and method that allows for extended memory addressing while maintaining compatibility with legacy devices. It is a further object of this invention to provide a processing system and method that allows for the use of a common addressing scheme independent of the location or type of memory being addressed. It is a further object of this invention to provide a processing system and method that allows for the use of either a location-dependent or location-independent addressing scheme for memory access.

These objects and others are achieved by providing a processing system that supports memory access based on distinct memory space access instructions as well as universal access instructions that are independent of memory space partitions. Conventional memory-space dependent instructions, such as MOV, MOVX, and MOVC, provide an optimized addressing scheme, and an extended memory-space independent instruction EMOV provides an optimized code efficiency, processing speed, and ease of code generation. A mapping between the discrete memory space partitions and a "universal" memory space allocation is provided. The processing hardware interprets the universal address to determine the corresponding memory space, and provides the access to an address within that memory space.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
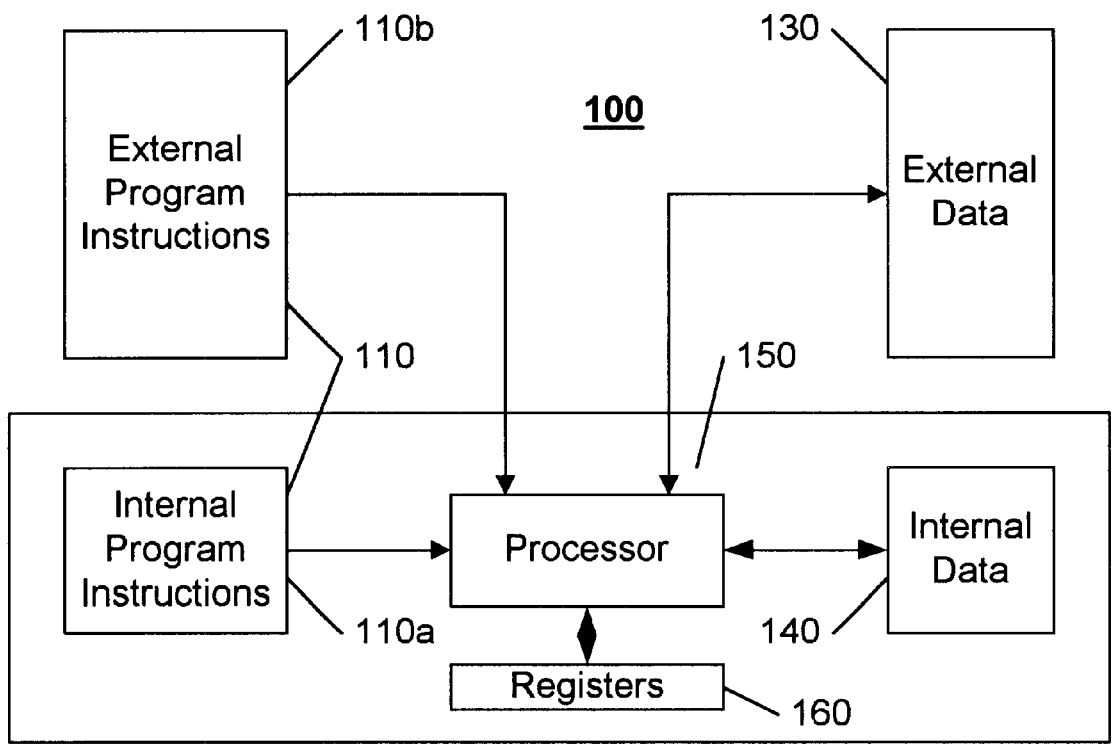
FIG. 1 illustrates an example block diagram of a processing system architecture that is suitable for use in accordance with this invention.

FIG. 1 illustrates an example processing system 100 comprising a processor 150 and a plurality of discrete memory spaces 110, 130, 140. Also contained in the processing system 100 are registers 160 that are used to temporarily store parameters for use by the processor 150. In accordance with this invention, and consistent with prior art devices, each of the memory spaces 110, 130, 140 have an associated, and distinct, set of commands for access by the processor 150. For example, in the 80C51 family of processors, the internal data 140 is accessed via any of a set of MOV instructions; the external data 130 is accessed via any of a set of MOVX instructions, and the program instructions 110, whether internal 110a or external 110b, are accessed via any of a set of MOVC instructions. The program instructions are also accessed during a program's execution, typically based on the contents of a program counter register that is used to provide the appropriate sequence of program instructions to the processor 150 for execution. The data memories 130, 140 are typically read/write memories, and the sets of instruction include instructions to move data into, or retrieve data from, the appropriate memory area, at a specified or referenced address. The program memory is typically a read-only memory, which may be field programmable, and the set of MOVC instructions are typically instructions that retrieve pre-programmed parameters from the program memory.

Figure 2:
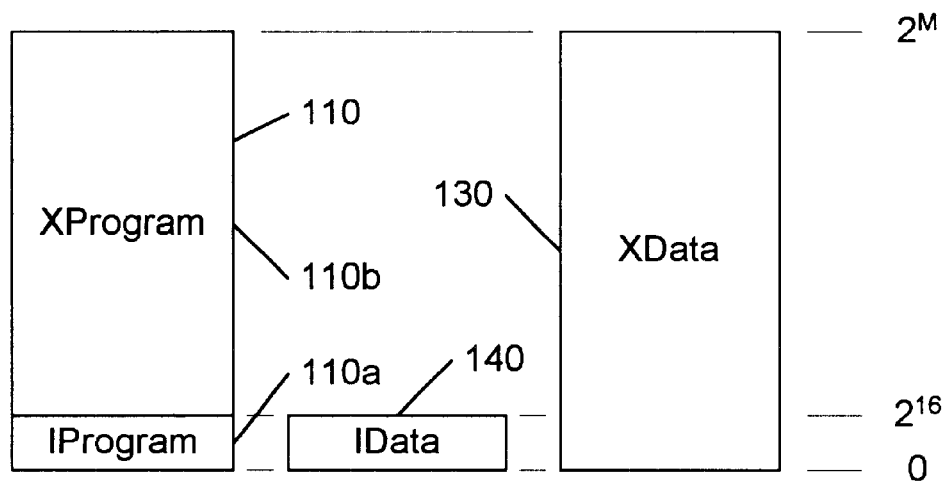
FIG. 2 illustrates an example extension of address spaces in a processing system having discrete memory spaces.

As discussed above, these distinct sets of instructions are required because each of the distinct memory spaces has memory locations that have the same address as another memory 5 space. FIG. 2 illustrates an example memory map that demonstrates this common addressing for an extended, N-bit, addressing scheme, where N is greater than the conventional address width, in this case, 16. As illustrated, each of the memory spaces 110, 130, and 140 have memory addresses in the lower address range (0 to $2^{16}-1$). The internal memory 140 is illustrated as being limited to 16-bits, for illustration purposes. The program code 110 and external data share memory addresses in the upper range (0 to $2^N-1$). An instruction to read a byte from address 1234, for example, needs to specify from which of the three memory spaces 110, 130, 140 to read the byte, because all three memory spaces 110a, 130, 140 have a memory location with an address 1234. In like manner, an instruction to read a byte from address 123456 needs to specify whether the byte is to be read from memory space 110b or memory space 130. Note that having different sets of memory access instructions for each memory space allows each memory space to contain addresses in the entire N-bit range (0 to $2^N-1$). As discussed below, however, the range of each memory space in a preferred embodiment is limited.

Figure 3:
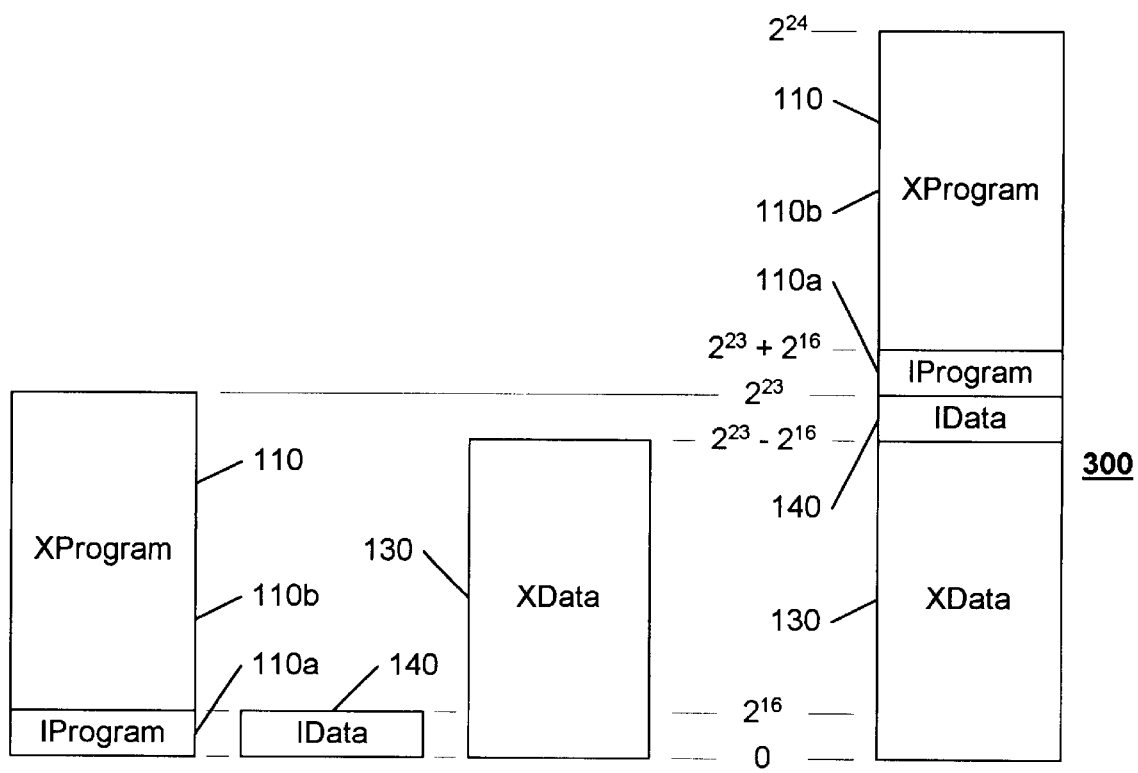
FIG. 3 illustrates an example mapping of discrete memory spaces to a uniform memory map in accordance with this invention.

FIG. 3 illustrates a uniform memory map 300 in accordance with this invention. Although each memory space is addressable as discussed above with regard to FIG. 2, the uniform memory map 300 is configured as a contiguous address space with a logical address range of 0 to $2^M-1$. Mapped to this contiguous address space are the memory spaces 110, 130, and 140, each location of each memory space having a unique logical address. As noted above, each of the memory spaces 110, 130, and 140 may contain addresses in the entire N-bit range (0 to $2^N-1$). If sufficient logical addressing is provided to accommodate each of these memory spaces at their maximum potential, N+2 bits are required for accessing this uniform memory map 300. If N is determined by the number of bytes used for addressing (e.g. N=24 for 3-byte addressing; N=32 for 4-byte addressing; etc.), appending an extra two bits to provide this uniform memory map 300 will be inefficient.

In a preferred embodiment, each memory space is limited to size that allows all of the memory spaces to be accommodated in a uniform memory map 300 that is addressable by an integer number of bytes. That is, if the address extension is to 3-bytes, the memory spaces are sized so that the total size of the uniform memory map is $2^{24}$ bytes (16 Megabytes). In a preferred embodiment for an 80C51-compatible processor, the size of the program memory space is limited to 223 bytes (8 Megabytes), the internal data memory space is limited to 216 bytes (64 Kilobytes), and the external data memory space is limited to ($2^{23}-2^{16}$) bytes (8 MB less 64 KB). This allocation of memory space sizes is presented based on an estimate of the program code and data requirements for future programs and applications, and is not intended to limit the scope of this invention. As illustrated in FIG. 3, the external data memory space is mapped to logical addresses 0 to ($2^{23}-2^{16}-1$); the internal memory space is mapped to logical addresses ($2^{23}-2^{16}$) to ($2^{23}-1$); and the program memory space is mapped to logical addresses ($2^{23}$) to ($2^{24}-1$). The logical address associated with the uniform memory map 300, which can address the program memory space, the internal data memory space, or the external data memory space is hereinafter referred to as a "universal" address.

The uniform memory map 306 allows the use of a common set of instructions to access :Hi any of the three memory spaces 110, 130, 140. The set of instructions are hereinafter referred to as a set of EMOV (Extended Move) instructions. These EMOV instructions are provided in addition to the conventional MOV, MOVX, and MOVC instructions, thereby providing compatibility with legacy applications and subroutines. Consider, for example, reading a byte from address '12344H of the program memory 110, where 'xxxxh signifies a hexadecimal address xxxx. This access can be accomplished by loading a register pair that is associated with the MOVC instruction with the address 'xxxxh, and then executing the MOVC instruction. This access can also be accomplished by loading a register triplet that is associated with the EMOV instruction with the address '801234H, and then executing the EMOV instruction. In like manner, an access to an address '23H in the internal data memory space can be accomplished by executing a MOV instruction that contains address '23H, or a reference to a location that contains '23H. This access can also be accomplished by loading the register triplet that is associated with the EMOV instruction with the address '7F0023H, and then executing the EMOV instruction.

Although the access to an individual memory space requires more processing time and resources, by requiring a register triplet for each universal address, this universal addressing provides a significant processing time and resource savings for programs that are compiled from higher level language programs. At the assembly-language level, a programmer can selectively use the appropriate MOV, MOVX, or MOVC instructions, and thereby save processing time and resources, because the assembly language programmer is likely to be aware of the memory space being accessed. At a higher level language, however, the programmer is likely not to know which memory space is being used, or, more likely, specifically provides programs and utilities that will operate properly independent of the memory space being used. As discussed above, a "pointer" in a higher level language may point to an item that is located in any of the discrete memory spaces. The compiled code corresponding to a reference to a pointer, absent this invention, includes a determination of the particular memory space being referenced, and the subsequent execution of instructions from the particular set of instructions (MOV, MOVX, or MOVC) corresponding to the determined memory space. A typical storage of an item to a memory location referenced by a pointer will be compiled into at least three instructions (test, move, jump) for each type of memory space, plus the instructions to load the pointer value into the appropriate registers corresponding to the move instruction. By providing the uniform memory map and a corresponding set of EMOV instructions, the compiler merely produces a sequence of instructions that load the pointer value into the register triplet, and then moves the item using the EMOV instruction. It is estimated that a five to ten-fold improvement in efficiency is achievable for each compiled pointer reference.

Figure 4:
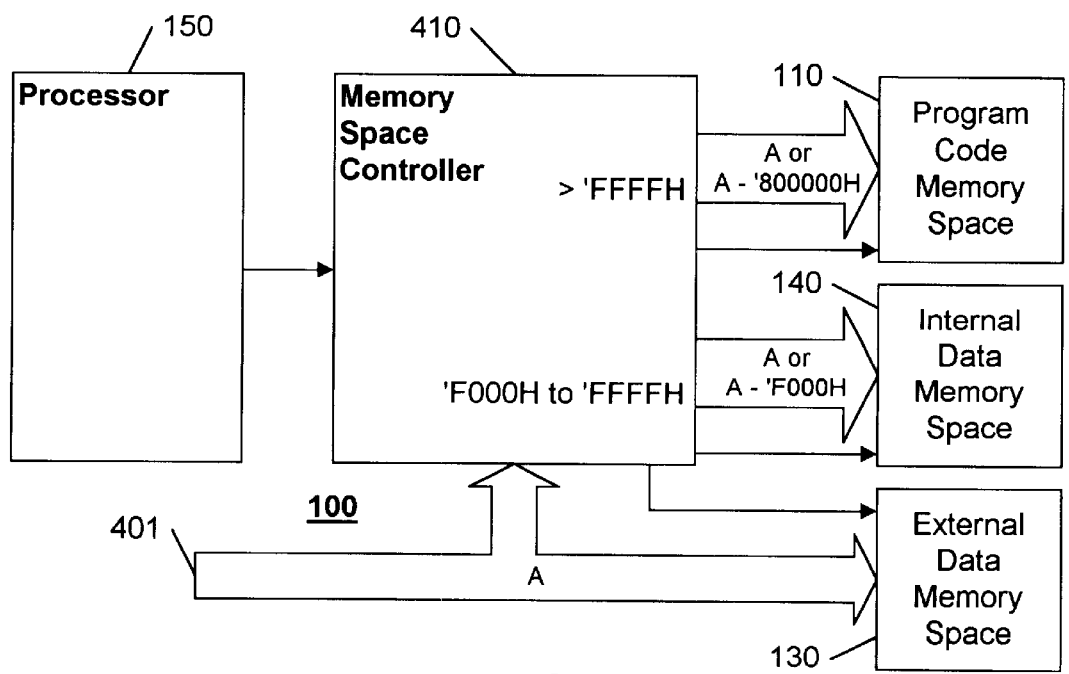
FIG. 4 illustrates an example block diagram of a processing system architecture having a memory space controller in accordance with this invention.

FIG. 4 illustrates an example block diagram of a memory space controller 410 for processing an address into an appropriate address for accessing the individual memory space 110, 130, 140. In accordance with this invention, the memory state controller 410 is configured to control the access to the memory spaces 110, 130, 140 for all program instructions that access the memory spaces 110, 130, 140.

In the example presented above, the MOV, MOVX, MOVC, and EMOV instructions are provided to the memory space controller 410. Upon receipt of a MOV command, the memory space controller 410 provides the address A on the address bus 401 to the internal data memory space 140, and provides a control signal to enable the internal data memory space 140 for this access. The external data memory space 130 is connected directly to the address bus 401. Upon receipt of a MOVX command, the memory space controller 410 provides a control signal to enable the external data memory space 130 to use the address A on the address bys 401 for this access. Upon receipt of a MOVC command, the memory space controller 410 provides the address A on the address bus 401 to the program code memory space 110, and provides a control signal to enable the program code Upon receipt of an EMOV command, the memory space controller 410 compares the address A on the address bus 401 to the logical address range that is associated with the internal data memory space 140. If the address A in this example is in the range of 'F000H to 'FFFFH, the memory space controller 410 subtracts 'F000H from the address A on the address bus 401, and provides this modified address to the internal data memory space 140, and the control signal that enables the internal memory space 140 for this access. If the address A in this example is greater than 'FFFFH, the memory space controller 410 subtracts '800000H from the address A on the address bus 401, and provides this modified address to the program code memory space 110, and the control signal that enables the program code memory space 110 for this access. Otherwise, the address must be below 'EFFFH, and therefore associated with the external data memory space 130. Because the external data memory space 130 is mapped directly to the universal address, a modification of the address A on the address bus 401 is not required, and the memory space controller 410 merely provides the control signal to enable the external memory space 140 for this access.

Note that by providing a memory space controller 410 that controls the access to the discrete memory spaces in dependence upon the particular instruction being executed by the processor 150, the processing system 100 in accordance with this invention provides compatibility with legacy programs and applications that use different sets of instructions for different memory spaces, while also allowing the use of an extended set of instructions for a universal addressing scheme. As discussed above, in addition to providing compatibility with legacy devices, this multiple addressing scheme also allows the optimization of code generation at an assembly-language level, as well as the optimization of code generation by a compiler that processes a higher-level language, such as the "C" programming language.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A microcontroller, comprising:

a processor;

an internal program memory, a plurality of registers, and an internal data memory, all coupled to the processor; and a memory space controller coupled to the processor;

wherein the processor is operable, in cooperation with the memory space controller, to access only the internal program memory in response to a first set of instructions, the first set of instructions providing an address component comprising a first number of bits; the processor further operable, in cooperation with the memory space controller, to access only the internal data memory in response to a second set of instructions, the second set of instructions providing an address component comprising the first number of bits, the processor further operable to access the internal program memory, the internal data memory, an external program memory, and an external data memory, in cooperation with the memory space controller, responsive to a third set of instructions, the third set of instructions providing a logical address comprising a second number of bits, the second number being greater than the first number.

2. The microcontroller of claim 1, wherein the memory space controller is operable to subtract a first value from the logical address of the third set of instructions if that logical address is between a first logical address and a second logical address; and wherein the memory space controller is operable to subtract a second value from the logical address of the third set of instructions if that logical address is greater than the second logical address.

3. The microcontroller of claim 2, wherein the memory space controller is further operable to present the result of subtracting the first value from the logical address of the third set of instructions if that logical address is between the first logical address and the second logical address to the internal data memory.

4. The microcontroller of claim 3, wherein the memory space controller is further operable to present the result of subtracting the second value from the logical address of the third set of instructions if that logical address is greater than the second logical address to the internal data memory.

5. The microcontroller of claim 4, wherein the first number of bits corresponds to two bytes, and the second number of bits corresponds to three bytes.

6. The microcontroller of claim 1, wherein the memory space controller is operable to modify the logical address of the third set of instructions in a first way if that logical address is in a first address range, and is further operable to modify the logical address of the third set of instructions is a second way if that logical address is in a second address range.

7. The microcontroller of claim 6, wherein the first set of instructions comprises a first subset of the instruction set of the 8051 microcontroller, the second set of instructions comprises a second subset of the instruction set of the 8051 microcontroller, and the third set of instructions is not a subset of the instruction set of the 8051 microcontroller.

8. The microcontroller of claim 7, wherein the first number of bits corresponds to two bytes, and the second number of bits corresponds to three bytes.

9. A method of operating a microcontroller, comprising:

executing a first instruction, the first instruction providing a logical address;

determining if the logical address is within a first address range or a second address range;

modifying the logical address in a first way if the logical address is within the first address range;

modifying the logical address in a second way if the logical address is within a second address range;

presenting the modified address to at least one of a plurality of memory spaces so to access a memory location.

10. The method of claim 9, wherein modifying the logical address in the first way comprises subtracting a first value from the logical address; and wherein modifying the logical address in the second way comprises subtracting a second value from the logical address.

11. The method of claim 10, wherein the microcontroller is operable to execute the 8051 instruction set and the first instruction is not part of the 8051 instruction set.

12. The method of claim 9, wherein the plurality of memory spaces includes an internal program memory, an internal data memory, an external program memory, and an external data memory.

13. The method of claim 12, wherein the internal data memory is accessed if the logical address is within the first address range, and the internal program memory is accessed if the logical address is within the second address range.

14. The method of claim 13, wherein the microcontroller is operable to execute the 8051 instruction set, the first instruction is not part of the 8051 instruction set, and the logical address is larger than at least two bytes.

15. The method of claim 14, further comprising providing control signals from the memory space controller to at least the internal data memory and external data memory.

* * * * *